United States Patent [19]
Jarocki et al.

[11] Patent Number: 5,211,466
[45] Date of Patent: May 18, 1993

[54] VEHICLE REAR SIGNAL LIGHT ASSEMBLY OF THE HIGH MOUNTED TYPE

[75] Inventors: Corey J. Jarocki, Mt. Clemens; Jason W. Provancher, Dearborn, both of Mich.

[73] Assignee: Ford Motor Company, Dearborn, Mich.

[21] Appl. No.: 898,658

[22] Filed: Jun. 15, 1992

[51] Int. Cl.$^5$ .............................................. B60Q 1/44
[52] U.S. Cl. ..................... 362/83.3; 362/74; 362/80; 362/80.1; 296/146 M; 340/479
[58] Field of Search ............... 362/61, 74, 80, 80.1, 362/83.3, 368, 800; 296/146 M, 201; 340/471, 475, 479

[56] References Cited

U.S. PATENT DOCUMENTS

| | | | |
|---|---|---|---|
| 2,891,140 | 6/1959 | Huff | 362/80 |
| 3,895,859 | 7/1975 | Yoshida et al. | 296/146 M |
| 4,463,411 | 7/1984 | Proctor | 362/368 |
| 4,488,141 | 12/1984 | Ohlenforst et al. | 340/97 |
| 4,758,931 | 7/1988 | Gabaldon | 362/61 |
| 4,920,330 | 4/1990 | Plozner | 340/467 |
| 4,938,521 | 7/1990 | Kunert | 296/96.21 |
| 4,954,808 | 9/1990 | Duerkob | 340/475 |
| 4,993,774 | 2/1991 | Greenhalgh et al. | 296/201 |
| 5,050,050 | 9/1991 | Alder | 362/80.1 |
| 5,050,051 | 9/1991 | Machida et al. | |

FOREIGN PATENT DOCUMENTS

| | | | |
|---|---|---|---|
| 2663272 | 12/1991 | France | 362/74 |
| 2663274 | 12/1991 | France | 362/74 |
| 57-37038 | 3/1982 | Japan | |

Primary Examiner—Ira S. Lazarus
Assistant Examiner—Y. Quach
Attorney, Agent, or Firm—Roger L. May; Paul K. Godwin, Jr.

[57] ABSTRACT

A vehicle rear signal light assembly (16) of the high mounted type is mounted within a rear roof header (18) of a roof panel (12) to shine a light signal from a source (40) through a lens (38) aligned with an opening (36) in an obscuration band (34) of an upper rear window edge portion (28) covering an outwardly opening flanged construction of the roof header. The signal light assembly (16) by utilizing existing vehicle structure does not intrude into the interior space of the occupant compartment either at its storage shelf or its headroom. Different embodiments of the signal light assembly (16,16a,16b) provide a brake signal, turn signals, and both brake and turn signals. The light source (40) may be either an electric bulb that shines through a lens (38) or one or more light emitting diodes (56) that shine through the lens which is aligned with the opening (36) in the obscuration band (40) through which the signal shines.

19 Claims, 4 Drawing Sheets

VEHICLE REAR SIGNAL LIGHT ASSEMBLY OF THE HIGH MOUNTED TYPE

TECHNICAL FIELD

This invention relates to a vehicle rear signal light assembly of the high mounted type for providing a signal through the vehicle rear window.

BACKGROUND ART

Prior to about ten years or so ago, vehicle rear signal light assemblies were conventionally mounted only at the rear extremities of the rear quarter panel below what is referred to as the beltline that generally corresponds to the lower extremities of the vehicle windows. More recently additional vehicle rear signal light assemblies have been mounted above the belt line to shine through the vehicle rear window and are referred to as being of the high mounted type. One form of high mounted vehicle rear signal light assembly is located adjacent the lower extremity of the vehicle rear window, as disclosed by U.S. Pat. Nos.: 4,954,808 Duerkob and 5,050,051 Machida et al, generally adjacent the rear storage shelf and thus decreases the available space for storage. Another form of high mounted vehicle rear signal light assemblies is mounted adjacent the upper extremity of the vehicle rear window, as disclosed by U.S. Pat. Nos. 4,488,141 Ohlenforst et al and 5,050,050 Alder as well as by Japanese Patent Disclosure 57-37038, and such constructions are normally mounted directly on the vehicle glass or below the rear window header so as to restrict headroom. Other constructions such as disclosed by U.S. Pat. No. 4,920,303 Plozner have high mounted vehicle rear signal light assemblies located adjacent both the lower and upper extremities of the rear window and thus limit storage space as well as restricting headroom.

DISCOURSE OF INVENTION

An object of the present invention is to provide an improved vehicle rear signal light assembly of the high mounted type which can be mounted within existing vehicle structure so as to have a compact construction that does not utilize any additional interior space of the vehicle occupant compartment.

In carrying out the above objects and other objects of the invention, a high mounted type vehicle rear signal light assembly constructed in accordance with this invention includes a body panel having a rear extremity including a header that has outer and inner flanges and an outwardly opening intermediate portion located between the flanges. A rear window of the assembly has an edge portion that is secured to the flanges of the header and includes an obscuration band that hides the header from sight through the rear window. This obscuration band of the edge portion of the rear window has an opening between the flanges of the header, and a lens of the assembly is mounted in alignment with the opening in the obscuration band of the edge portion of the rear window. A signal light source of the assembly is mounted within the intermediate portion of the header in alignment with the lens to shine light rearwardly therethrough to provide a signal.

In preferred constructions disclosed, the vehicle rear signal light assembly has the body panel provided by a roof panel whose rear extremity includes a rear roof header, and the edge portion of the rear window is an upper edge portion that covers the rear roof header in whose intermediate portion the signal light source is mounted and covered by the lens.

In one disclosed embodiment, the opening in the obscuration band of the upper edge portion of the rear window, the lens, and the signal light source are centrally located with respect to the associated vehicle and provide a braking signal.

In another disclosed embodiment, the rear signal light assembly includes a second opening in the obscuration band of the upper edge portion of the rear window, a second lens aligned with the second opening, and a second signal light source mounted within the intermediate portion of the rear roof header in alignment with the second lens to shine light rearwardly therethrough to provide another signal. The two openings and the associated lenses and signal light sources of this embodiment are located at laterally spaced locations with respect to the upper edge portion of the rear window to provide turn signals.

In a further embodiment of the vehicle rear signal light assembly, the signal light source and lens are centrally located with respect to the upper edge portion of the rear window and provide a braking signal, and the assembly also includes a pair of additional lenses and associated signal light sources located on opposite sides of the centrally located lens and light source to provide turn signals. The obscuration band of the upper edge portion of the rear window in this embodiment preferably has a pair of additional openings aligned with the pair of additional lenses and associated signal light sources. Furthermore, the obscuration band has a pair of laterally spaced portions that respectively separate the central opening from the pair of additional openings. In addition, the rear roof header most preferably includes a pair of partitions that are respectively aligned with the pair of laterally spaced portions of the obscuration band and respectively separate the central signal light source from the pair of additional signal light sources located on opposite sides of the central signal light source.

In another disclosed construction, the vehicle rear signal light assembly includes a pair of laterally spaced signal light sources that can both be lighted to provide a brake signal and which can be separately lighted to provide a turn signal. In this construction, the rear roof header preferably includes a partition between the pair of laterally spaced signal light sources so that operation of one of the signal light sources to provide a turn signal does not shine light through the other side of the light assembly.

Different constructions are disclosed for the signal light source. In one construction, the signal light source is a bulb which may also be utilized with a reflector to provide direction of the light in shining onto the lens. In another construction, the signal light source includes at least one light emitting diode. As specifically disclosed, the light source is a strip of light emitting diodes. In one construction, the intermediate portion of the rear roof header includes a slide mount for supporting the strip of light emitting diodes and the rear roof header includes an access opening through which the strip of light emitting diodes is inserted and removed from the slide mount for assembly or any necessary servicing.

The preferred construction of the vehicle rear signal light assembly also includes a seal located between the lens and the flanges. This seal prevents an adhesive that secures the upper edge portion of the rear window to the roof header flanges from contacting the lens in alignment with the opening in the obscuration band of the upper edge portion of the rear window.

The vehicle rear signal lamp assembly also preferably includes an adhesive bond that secures the lens between the roof header and the upper edge portion of the rear window. This adhesive bond most preferably extends between the lens and the flanges of the rear roof header.

The objects, feature and advantages of the present invention are readily apparent from the following detailed description of the best modes for carrying out the invention when taken in connection with the accompanying drawings.

BEST MODES FOR CARRYING OUT THE INVENTION

Figure 1:
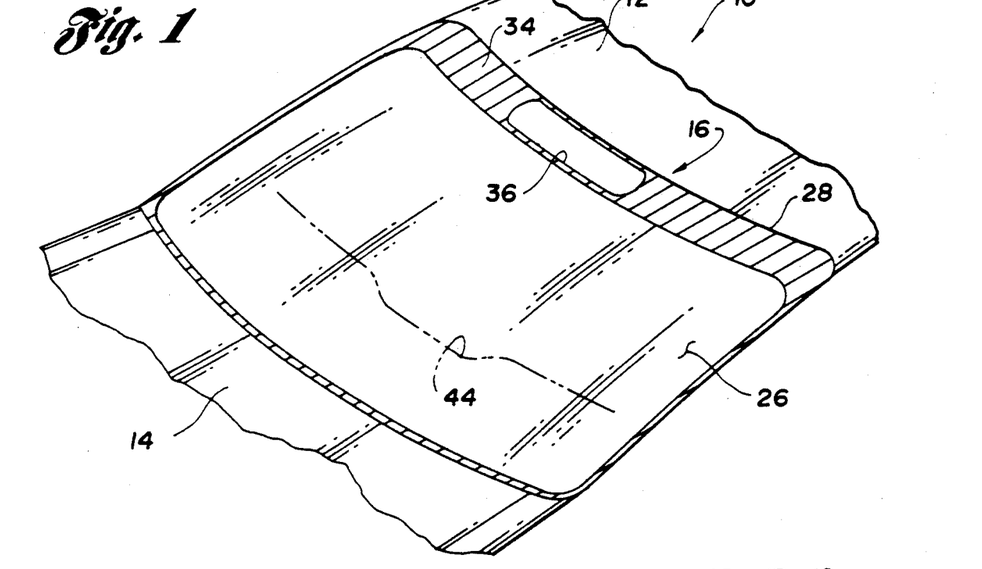
FIG. 1 is a partial perspective view of a vehicle including a high mounted type rear signal light assembly constructed in accordance with the present invention and illustrated at a central located to provide a braking signal.
Figure 2:
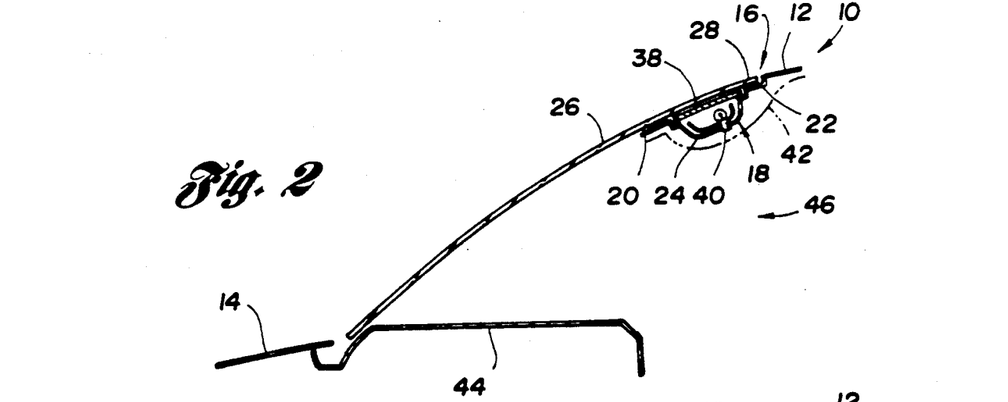
FIG. 2 is a sectional view taken along the direction of line 2—2 in FIG. 1 to further illustrate the manner in which the vehicle rear signal light assembly is mounted within the vehicle.
Figure 3:
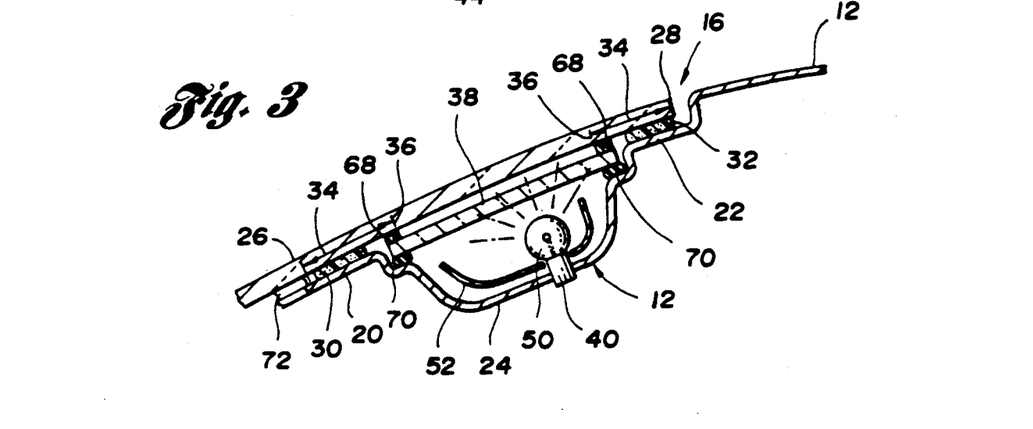
FIG. 3 is a view of a portion of FIG. 2 on an enlarged scale to further illustrate the construction of the rear signal light assembly.

With reference to FIGS. 1 through 3 of the drawings, a vehicle generally indicated by 10 has a body panel that is embodied by a roof panel 12 located forwardly and above a rear deck lid 14 in a conventional manner. At the rear extremity of the roof panel 12, the vehicle includes a rear signal light assembly 16 that is constructed in accordance with the present invention as is hereinafter more fully described and, as illustrated, is located at a central location to provide a braking signal.

As best illustrated in FIGS. 2 and 3, the roof panel 12 has its rear extremity provided with a header which is constructed as a rear roof header 18 that has outer and inner flanges 20 and 22 respectively, as well as an intermediate portion 24 that extends between the flanges. This intermediate portion 24 opens outwardly in rearward as well as upward directions between the outer and inner flanges 20 and 22 of the roof header 18.

As illustrated by combined reference to FIGS. 1 through 3, a rear window 26 of the vehicle has an edge portion embodied by an upper edge portion 28 that is secured to the flanges 20 and 22 of the roof header 18 by adhesive bonds 30 and 32. A periphery of the rear window 26 including its upper edge portion 28 includes an obscuration band 34 which is provided by etching of the glass and applying black paint prior to heating, bending and subsequent tempering of the rear window from a flat glass sheet. The obscuration band 34 is located on the interior surface of the glass sheet and hides the rear roof header 18 from sight through the rear window 26 at its upper edge portion 28. The obscuration band 34 of the upper edge portion of the rear window has an opening 36 between the flanges 20 and 22 of the rear roof header 18.

As best illustrated in FIG. 3, a lens 38 of the signal light assembly 16 is mounted in alignment with the opening 36 in the obscuration band 34 of the upper edge portion 28 of the rear window 26. Furthermore, a signal light source 40 is mounted within the intermediate portion 24 of the rear roof header 18 in alignment with the lens to shine light rearwardly therethrough to provide a signal. As previously mentioned, the signal provided with the embodiment of FIG. 1 is a braking signal with the light assembly located centrally as shown. It should be mentioned that this centrally located signal light assembly can extend laterally to any extent necessary and may, in fact, include the entire lateral width of the upper edge portion 28 of the rear window 26 in order to provide the desired extent of illumination for the braking signal. Furthermore, the lens 38 through which the light source 40 shines is preferably a red plastic lens with required prisms for redirecting upwardly shining light toward the rear.

It should be noted that the signal light assembly 16 as shown in FIG. 2 is mounted within the rear roof header 18 in a preexisting space and thus does not intrude on the vehicle headroom since the headliner 42 has the same position it would otherwise occupy without the signal light assembly. Likewise, there is no intrusion into the storage space of the rear storage shelf 44. Thus, the vehicle occupant compartment interior space is not affected while still having a relatively high located rear signal light assembly for providing a rearwardly directed light signal that is readily observable. As previously mentioned, the opening 36 in the obscuration band 34 of the upper edge portion 28 of the rear window 26, the lens 38, and the signal light source 40 are centrally located with respect to the associated vehicle and provide a braking signal which, according to current vehicle practice, will be utilized in combination with conventional brake lights at the rear extremity of the rear fenders or quarter panels.

Figure 4:
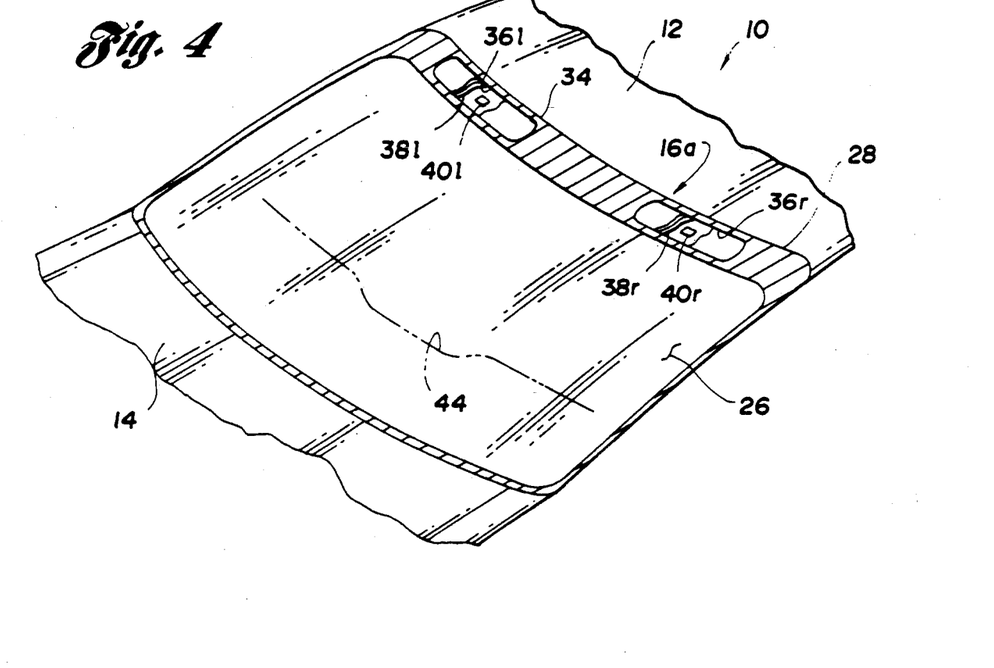
FIG. 4 is a view similar to FIG. 1 of another embodiment wherein the rear signal light assembly includes a pair of laterally spaced signal light sources and associated lenses for providing turn signals.

With reference to FIG. 4, another embodiment of the rear signal light assembly 16a includes a pair of openings 36l, 36r, a pair of lenses 38l and 38r, and a pair of signal light sources 40l and 40r that have the same construction as the previously described embodiment but are located at laterally spaced locations with respect to the upper edge portion 28 of the rear window 26 to provide left and right turn signals. Thus, the left signal light source 40l will be energized through conventional circuitry to provide a left turn signal, while the right signal light source 40r will be energized to provide a right turn signal. In each instance, the light will shine outwardly through the aligned lens 38l or 38r aligned with the associated opening 36l or 36r in the obscuration band 34.

Figure 5:
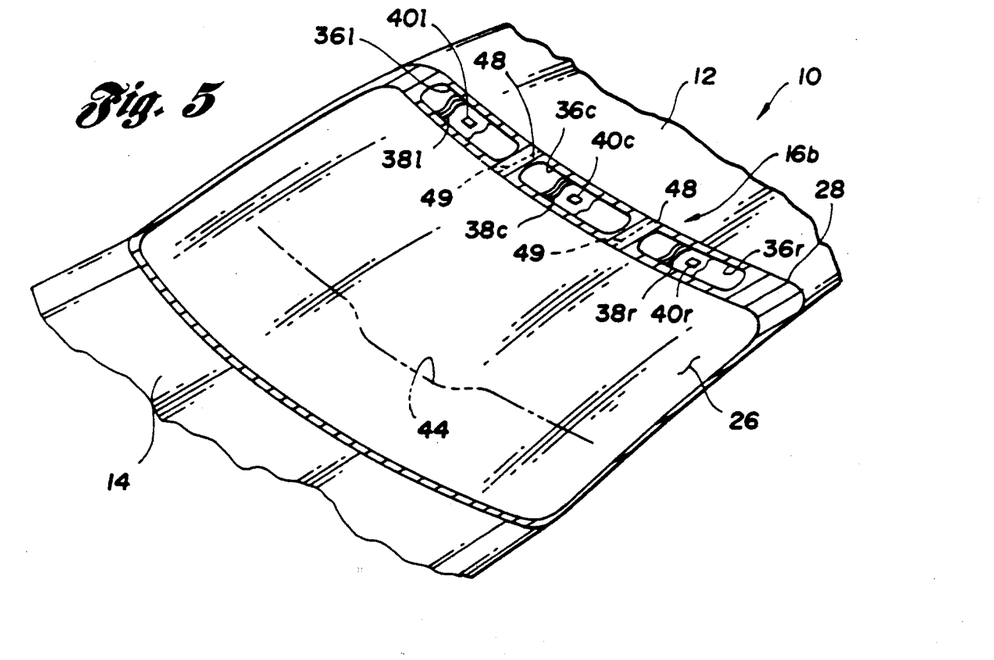
FIG. 5 is a view similar to FIGS. 1 and 4 of a further embodiment of the rear signal light assembly which includes a central signal light source and lens for providing a braking signal and a pair of laterally spaced signal light sources and associated lenses for providing turn signals.

With reference to FIG. 5, a further embodiment of the rear signal light assembly of this invention is indicated by 16b and includes a three signal light sources. More specifically, this embodiment has a central signal light source 40c and associated lens 38c aligned with an opening 36c in the obscuration band 34 so as to provide a brake signal. In addition, this embodiment also has left and right signal light sources 40l and 40r respectively aligned with lenses 38l and 38r that provide turn signals which preferably shine light through associated openings 36l and 36r of the obscuration band 34 of the upper edge portion 28 of the rear window 26. Thus, this embodiment provides a brake signal and/or a left or right turn signal as needed. In addition, it is also possible for all three of the signal light sources 40c, 40l and 40r to be flashed at the same time to provide a hazard signal. Furthermore, the lenses 38c, 38l and 38r can be made as separate components or integral with each other.

With continuing reference to FIG. 5, it should be noted that, while it is possible for the brake and turn signals to shine outwardly through a single opening in the obscuration band 34, it is preferable as previously mentioned to have separate openings as shown which are provided by the obscuration band having a pair of laterally spaced portions 48 that separate the central brake signal opening 36c from the left and right turn signal openings 36l and 36r. In addition, the rear roof header most preferably includes a pair of partitions 49 that are respectively aligned with the pair of laterally spaced portions 48 of the obscuration band 34 and respectively separate the brake signal light source 40c from the pair of turn signal light sources 40l and 40r located on opposite sides of the brake signal light source 40c.

In the embodiment of FIG. 3, the signal light source 40 is an electrical bulb 50. This bulb may also be utilized with a reflector 52 for directing light from the bulb. The interior of the intermediate portion 24 of the rear roof header 18 may likewise have a reflective coating applied thereto to provide a reflector function. A suitable access opening in the roof header may be provided for replacing or otherwise servicing the bulb 50 when necessary.

Figure 6:
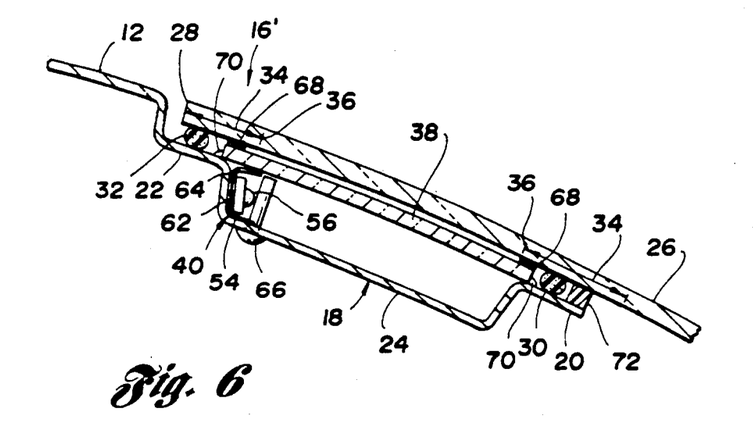
FIG. 6 is a sectional view through a further embodiment of the rear signal light assembly wherein the light source includes a strip of light emitting diodes.
Figure 7:
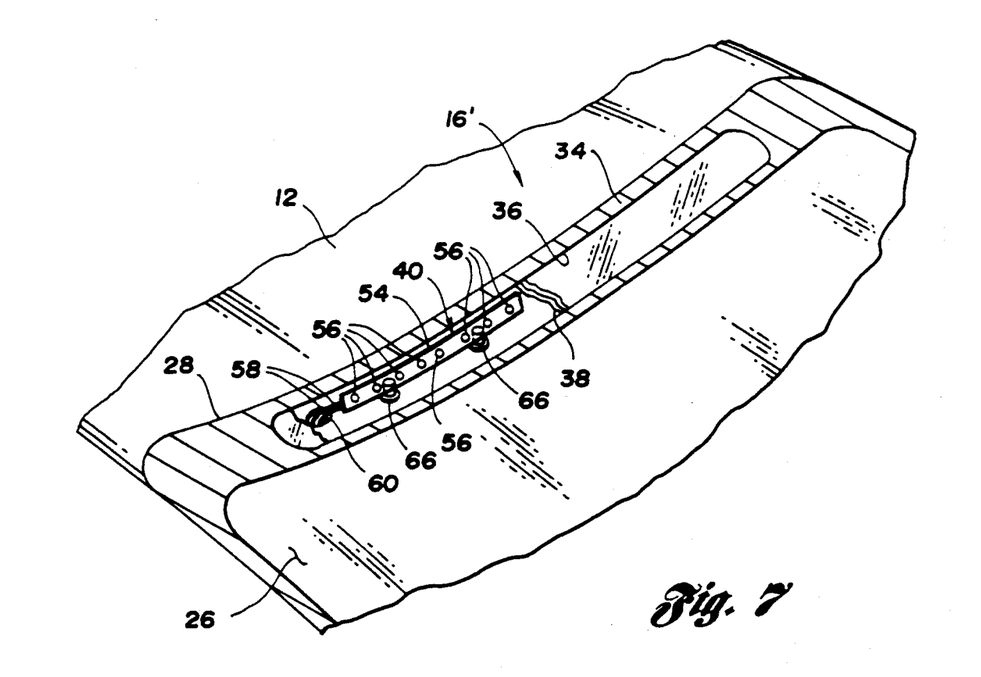
FIG. 7 is a partial perspective view that further illustrates the manner in which the light emitting diode strip is mounted on the associated vehicle.

With reference to FIGS. 6 and 7, another embodiment of the rear signal light assembly 16' has generally the same construction as the previously described embodiments except that its light source 40 includes a strip 54 having at least one light emitting diode 56. As shown in FIG. 7, this strip 54 preferably includes a plurality of the light emitting diodes 56 which are energized by wires 58 extending through an opening 60.

The light emitting diode strip 54 is maintained out of electrical contact with the vehicle roof by a suitable insulator 62 such as rubber tape and is mounted by a double-backed foam adhesive tape 64 that is bent to have a U-shaped cross section as shown in FIG. 6 and secured along its length by spaced plastic pins 66 that extend upwardly from the intermediate portion 24 of the rear roof header adjacent the inner flange 22.

With reference to FIGS. 3 and 6, each embodiment of the rear signal light assembly 16 includes a seal 68 which may be made of a suitable foam located between the lens 38 and the upper edge portion 28 of the rear window 16 such that the adhesive bonds 30 and 32 that secure the upper rear window edge portion 28 to the flanges 20 and 22 is prevented from contacting the lens within the opening 36 in the obscuration band 34 and destroying its optical operation.

As also illustrated in FIGS. 3 and 6, each embodiment of the rear signal light assembly also includes an adhesive bond 70 that secures the lens 38 between the roof header 18 and the upper edge portion 28 of the rear window 26. More specifically, the adhesive bond 70 extends between the lens 38 and the outer and inner flanges 20 and 22 of the rear roof header 18. Furthermore, each embodiment also has another seal 72 such as of a suitable foam for confining the adhesive of the bond 30 between the outer flange 20 and the upper edge portion 28 of the rear window 26.

Figure 8:
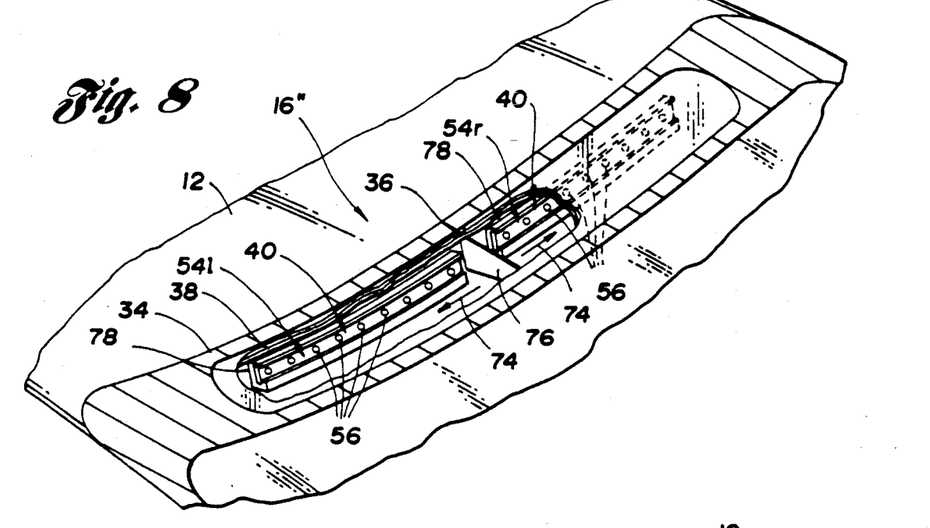
FIG. 8 is a view of a further embodiment which includes a pair of laterally spaced signal light sources that are both energized to provide a brake signal and which are separately energized to provide a turn signal.

With reference to FIG. 8, a further embodiment of the rear signal light assembly of this invention is indicated by 16" and includes a pair of laterally spaced signal light sources 40 that are embodied by left and right stripes 54l and 54r of light emitting diodes 56. These laterally spaced signal light sources 40 can be both lighted to provide a braking signal and can be separately lighted to provide a turn signal. More specifically, the turn signal is most effectively provided by sequentially lighting the most central light emitting diode 56 of each signal light source 40 and then progressively lighting the light emitting diodes laterally outward therefrom as illustrated by arrows 74. Furthermore, the associated rear roof header preferably includes a partition 76 between the pair of laterally spaced signal light sources 40 so that light does not shine from one light source to the other lateral side of the lens 38.

Figure 9:
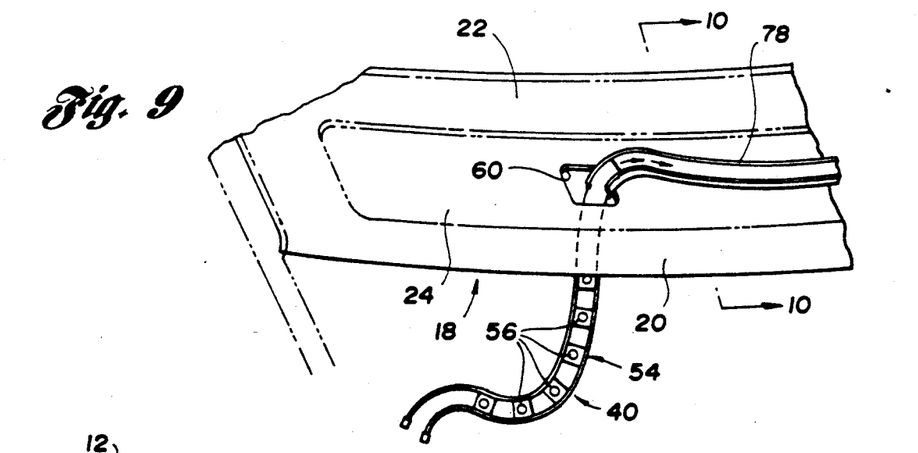
FIG. 9 is a partial perspective view illustrating a slide mount for mounting a strip of light emitting diodes which embodies the light source.
Figure 10:
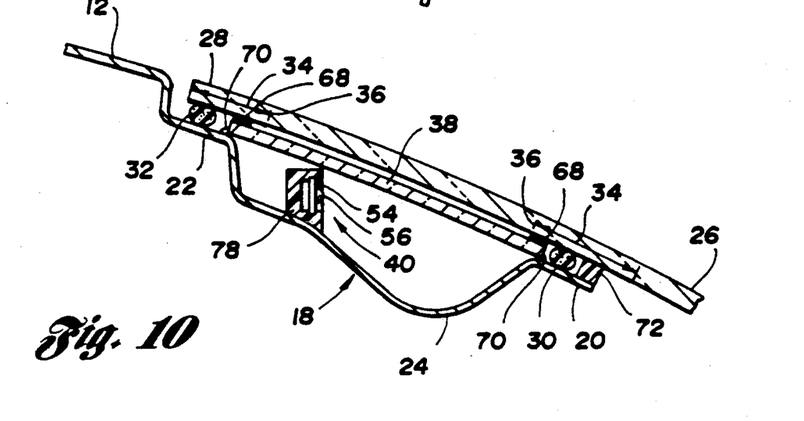
FIG. 10 is a sectional view taken along the direction of line 10—10 in FIG. 9 to further illustrate the construction of the slide mount that supports the strip of light emitting diodes.

With reference to FIGS. 8 and 9, when the signal light source 40 is constructed as a strip 54 of light emitting diodes 56, the intermediate portion 24 of the rear roof header 18 may include a slide mount 78 for supporting the strip of light emitting diodes. Furthermore, the rear roof header 18 as shown in FIG. 9 will then include an access opening 60 through which the strip 54 of light emitting diodes 56 is inserted and removed from the slide mount 78 for assembly and any necessary servicing.

It should be appreciated that while the preferred embodiments disclosed are all located at the upper edge portion of the vehicle rear window which is a construction for which the invention has particular utility, it is also possible for the rear signal light assembly to have other constructions such as at a location adjacent the lower edge portion of the rear window.

While the best modes for carrying out the invention have been described in detail, those familiar with the art to which this invention relates will recognize various alternative designs and embodiments for carrying out the invention as defined by the following claims.

We claim:

1. A vehicle rear signal light assembly of a high mounted type, comprising: a body panel having a rear extremity including a header that has outer and inner, outer and inner flanges and an outwardly opening intermediate portion located between the flanges; a rear window having an edge portion that is secured to the outer and inner flanges of the header and includes an obscuration band that hides the header from sight through the rear window; the obscuration band of the edge portion of the rear window having an opening between the outer and inner flanges of the header; a lens mounted in alignment with the opening in the obscuration band of the edge portion of the rear window; and a signal light source mounted within the outwardly opening intermediate portion of the header in alignment with the lens to shine light rearwardly therethrough to provide a signal.

2. A vehicle rear signal light assembly of a high mounted type as in claim 1 wherein said body panel is a roof panel whose rear extremity includes a rear roof header, and wherein said edge portion of the rear window is an upper edge portion that covers the rear roof header in whose outwardly opening intermediate portion the signal light source is mounted and covered by the lens.

3. A vehicle rear signal light assembly of a high mounted type as in claim 2 wherein the opening in the obscuration band of the upper edge portion of the rear window, the lens, and the signal light source are centrally located with respect to an associated vehicle and provide a braking signal.

4. A vehicle rear signal light assembly of a high mounted type as in claim 2 which includes a second opening in the obscuration band of the upper edge portion of the rear window, a second lens aligned with the second opening, and a second signal light source mounted within the outwardly opening intermediate portion of the rear roof header in alignment with the second lens to shine light rearwardly therethrough to provide another signal; and the two openings and the associated lenses and signal light sources being located at laterally spaced locations with respect to the upper edge portion of the rear window to provide turn signals.

5. A vehicle rear signal light assembly of a high mounted type as in claim 2 wherein the signal light source and lens are centrally located with respect to the upper edge portion of the rear window and provide a braking signal, and a pair of additional lenses and associated signal light sources located on opposite sides of the first lens and signal light source to provide turn signals.

6. A vehicle rear signal light assembly of a high mounted type as in claim 5 wherein the obscuration band of the upper edge portion of the rear window has a pair of additional openings aligned with the pair of additional lenses and associated signal light sources, and the obscuration band having a pair of laterally spaced portions that respectively separate the opening from the pair of additional openings.

7. A vehicle rear signal light assembly of a high mounted type as in claim 6 wherein the rear roof header further includes a pair of partitions that are respectively aligned with the pair of laterally spaced portions of the obscuration band and respectively separate the signal light source from the pair of additional signal light sources located on, opposite sides of the signal light source.

8. A vehicle rear signal light assembly of a high mounted type as in claim 2 which includes a pair of laterally spaced signal light sources that can both be lighted to provide a braking signal and which can be separately lighted to provide a turn signal.

9. A vehicle rear signal light assembly of a high mounted type as in claim 8 wherein the rear roof header includes a partition between the pair of laterally spaced signal light sources.

10. A vehicle rear signal light assembly of a high mounted type as in claim 2 wherein the signal light source is a bulb.

11. A vehicle rear signal light assembly of a high mounted type as in claim 10 wherein the signal light source also includes a reflector for directing light from the bulb.

12. A vehicle rear signal light assembly of a high mounted type as in claim 2 wherein the signal light source includes at least one light emitting diode.

13. A vehicle rear signal light assembly of a high mounted type as in claim 2 wherein the signal light source is a strip of light emitting diodes.

14. A vehicle rear signal light assembly of a high mounted type as in claim 13 wherein the outwardly opening intermediate portion of the rear roof header includes a slide mount for supporting the strip of light emitting diodes, and the rear roof header including an access opening through which the strip of light emitting diodes is inserted and removed from the slide mount.

15. A vehicle rear signal light assembly of a high mounted type as in claim 2 further including a seal located between the lens and the upper edge portion of the rear window, and an adhesive that secures the upper edge portion of the rear window to the outer and inner flanges but is prevented by the seal from contacting the lens in alignment with the opening in the obscuration band of the upper edge portion of the rear window where light shines through to provide the signal.

16. A vehicle rear signal light assembly of a high mounted type as in claim 2 further including an adhesive bond that secures the lens between the rear roof header and the upper edge portion of the rear window.

17. A vehicle rear signal light assembly of a high mounted type as in claim 16 wherein the adhesive bond extends between the lens and the outer and inner flanges of the rear roof header.

18. A vehicle rear signal light assembly of a high mounted type, comprising: a roof panel having a rear extremity including a rear roof header that has outer and inner flanges and an outwardly opening intermediate portion located between the outer and inner flanges; a rear window having an upper edge portion; an adhesive bond that secures the upper edge portion of the rear window to the outer and inner flanges of the rear roof header; the upper edge portion of the rear window including an obscuration band that hides the rear roof header from sight through the rear window; the obscuration band of the upper edge portion of the rear window having an opening between the outer and inner flanges of the rear roof header; a lens mounted in alignment with the opening in the obscuration band of the upper edge portion of the rear window; a seal that prevents the adhesive bond from contacting the lens in alignment with the opening in the obscuration band of the upper edge portion of the rear window; and a signal light source mounted within the outwardly opening intermediate portion of the rear roof header in alignment with the lens to shine light rearwardly therethrough to provide a signal.

19. A vehicle rear signal light assembly of a high mounted type, comprising: a roof panel having a rear extremity including a rear roof header that has outer and inner flanges and an outwardly opening intermediate portion located between the flanges; a rear window having an upper edge portion; an adhesive bond that secures the upper edge portion of the rear window to the flanges of the rear roof header; the upper edge portion of the rear window including an obscuration band that hides the rear roof header from sight through the rear window; the obscuration band of the upper edge portion of the rear window having an opening between the flanges of the rear roof header; a seal that prevents the adhesive bond from contacting the lens in alignment with the opening in the obscuration band of the upper edge portion of the rear window; a lens mounted in alignment with the opening in the obscuration band of the upper edge portion of the rear window; another adhesive that secures the lens to both the outer and inner flanges of the rear roof header; a signal light source mounted within the outwardly opening intermediate portion of the rear roof header in alignment with the lens to shine light rearwardly therethrough to provide a signal; and the signal light source being selected from the group consisting of an electric bulb and a light emitting diode.

* * * * *

UNITED STATES PATENT AND TRADEMARK OFFICE
CERTIFICATE OF CORRECTION

PATENT NO. : 5,211,466

DATED : May 18, 1993

INVENTOR(S) : Corey J. Jarocki, et al

Page 1 of 2

It is certified that error appears in the above-indentified patent and that said Letters Patent is hereby corrected as shown below:

Column 3, line 9: After "objects," delete "feature" and substitute --features--.

Column 3, line 19: After "central" delete "located" and substitute --location--.

Column 5, line 10: After "includes" delete "a".

Column 6, line 23: After "right" delete "stripes" and substitute --strips--.

Column 6, line 61, Claim 1: After "that has" delete "outer and inner," (first occurrence).

Column 6, line 63, Claim 1: Before "flanges" insert --outer and inner--.

Column 7, line 40, Claim 5: Before "lens" delete "first".

Column 7, line 55, Claim 7: After "on" delete the comma (,).

Column 8, line 62, Claim 19: Before "flanges" insert --outer and inner--.

UNITED STATES PATENT AND TRADEMARK OFFICE
CERTIFICATE OF CORRECTION

PATENT NO.  : 5,211,466
DATED       : May 18, 1993
INVENTOR(S) : Corey J. Jarocki, et al It is certified that error appears in the above-indentified patent and that said Letters Patent is hereby corrected as shown below:

```
Column 8, line 65, Claim 19:   Before "flanges"
insert --outer and inner--.

Column 9, line 2, Claim 19:    Before "flanges"
insert --outer and inner--.
```

Signed and Sealed this

Eighth Day of February, 1994

Attest:

BRUCE LEHMAN

*Attesting Officer*          *Commissioner of Patents and Trademarks*